(12) United States Patent
Takamura

(10) Patent No.: US 6,591,165 B2
(45) Date of Patent: Jul. 8, 2003

(54) ROBOT APPARATUS, BODY UNIT AND COUPLING UNIT

(75) Inventor: Seiichi Takamura, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/107,850

(22) Filed: Mar. 27, 2002

(65) Prior Publication Data

US 2002/0143436 A1 Oct. 3, 2002

Related U.S. Application Data

(63) Continuation of application No. 09/483,778, filed on Jan. 18, 2000, now Pat. No. 6,421,585.

(30) Foreign Application Priority Data

Jan. 18, 1999 (JP) ............................................ 11-009582

(51) Int. Cl.[7] ............................................. G06F 19/00
(52) U.S. Cl. ................... 700/245; 700/246; 700/247; 700/248; 700/249; 700/250; 700/251; 700/253; 700/257; 700/259; 700/260; 700/261; 700/262; 700/263; 700/264; 318/568.12; 318/568.15; 318/568.17; 318/573; 901/1; 901/22; 901/46; 901/47; 701/23
(58) Field of Search ................................. 700/248–251, 700/245, 253, 259–264, 275, 246, 247, 257, 302; 318/568.12, 568.17, 568.15, 573; 370/259, 522; 706/10, 13, 45; 901/1, 46, 47, 22; 701/23; 707/204, 205; 711/112, 202, 221, 4

(56) References Cited

U.S. PATENT DOCUMENTS

| | | | |
|---|---|---|---|
| 3,911,613 A | 10/1975 | Morison et al. | 446/338 |
| 4,990,839 A | 2/1991 | Schonlau | 700/248 |
| 5,100,362 A | 3/1992 | Fogarty et al. | 446/272 |
| 5,172,806 A | 12/1992 | Mickelberg | 206/756 |
| 5,289,916 A | 3/1994 | Mickelberg | 206/756 |
| 5,428,713 A | 6/1995 | Matsumaru | 700/254 |
| 5,606,494 A | 2/1997 | Oshima et al. | 700/59 |
| 5,626,505 A | 5/1997 | Cheng | 446/278 |
| 5,963,712 A | 10/1999 | Fujita et al. | 700/264 |
| 6,321,140 B1 * | 11/2001 | Fujita et al. | 700/248 |
| 6,330,494 B1 * | 12/2001 | Yamamoto | 700/261 |
| 6,438,457 B1 * | 8/2002 | Yokoo et al. | 700/245 |
| 6,470,237 B2 * | 10/2002 | Fujita et al. | 700/248 |

OTHER PUBLICATIONS

Heiserman, K–9 Robot, 1979, Internet, p1.

Sony, Robot–Pet Aibo, Jun. 1, 1000, Internet, no date.

Agah et al., Architectural and Functional Specifications for a Robot Kitten "Robokoneko" to be Controlled by a 10,000 Evolved Neural Net Module Artificial Brain, 1993–2001, Internet.

* cited by examiner

Primary Examiner—William A. Cuchlinski, Jr.
Assistant Examiner—McDieunel Marc
(74) Attorney, Agent, or Firm—Frommer Lawrence & Haug LLP; William S. Frommer

(57) ABSTRACT

A robot system having a plurality of component units. The robot system includes a first storage device, and a second storage device. The robot system further includes a plurality of control devices, with a first component control device provided with the first component unit and a second component control device provided with the second component unit. The first component control device controls the first component unit and the second component control device controls the second component unit.

18 Claims, 6 Drawing Sheets

ROBOT APPARATUS, BODY UNIT AND COUPLING UNIT

This is a continuation of application Ser. No. 09/483,778, filed Jan. 18, 2000, now U.S. Pat. No. 6,421,585 issued on Jan. 18, 2000.

BACKGROUND OF THE INVENTION

This invention relates to a robot apparatus, a body unit thereof, and a coupling unit thereof, and more particularly, is suitably applied to an autonomic robot In recent years, autonomic robot apparatuses have been proposed that determine their movements based on instruction signals supplied from an external control device or surrounding image information input from a sensor attached at a predetermined position. Though such an autonomic robot apparatus receives an instruction signal from the control device or image information from the sensor, it vaguely moves in the beginning. Then, it gradually makes movements suitable for the input instruction signal and image information by repeating such movements.

That is, when the autonomic robot apparatus, receiving an instruction from the control device and image information from the sensor, vaguely moves, it sequentially stores in a internal storage means as learned data, the input instruction signal and image information as well as movement information indicating how it moves in response to these signal and information. Subsequently, when the autonomic robot apparatus makes a movement in response to the instruction signal the same as that previously received and stored in the storage means, it evaluates the past learned data stored in the storage means and the present learned data based on predetermined parameters.

As a result, if the autonomic robot apparatus determines that the present learned data has higher rating than the past learned data, it deletes the past learned data from the storage means and stores the present learned data. On the other hand, if the autonomic robot apparatus determines that the past learned data has higher rating than the present learned data, it discards the present learned data and keep the past learned data in the storage means. In this manner, by gradually writing learned data to the storage means to accumulate it therein, the autonomic robot apparatus acquires the capability of autonomically determining its movements depending on an externally provided command. In this case, the autonomic robot apparatus uses as a method of storing learned data, a centralized management method of storing the learned data in a single storage means for management.

Incidentally, some autonomic robot apparatuses are an integral type and do not require units to be removed, but those comprising a plurality of units have recently been designed. The robot apparatus comprising a plurality of units is constructed by, for example, connecting together a head unit corresponding to an animal's head, a body unit corresponding to the animal's body, and a manipulator unit corresponding to the animal's legs.

In fact, the robot apparatus comprising a plurality of units is constructed by combining desired units which are selected from a group of head units including a plurality of head units, a group of body units including a plurality of body units, and a group of manipulator units including a plurality of manipulator units. Then, if, for example, the head unit must be replaced with a new one, the robot apparatus can change the combination of units by selecting a desired one from the group of head units and replacing the currently connected head unit with the selected head unit selected from the group of head units.

By the way, in the robot apparatus comprising a plurality of units, in the case of using the centralized management method as the method of storing learned data, the learned data is stored in, for example, a storage means of the body unit for management. If such a robot apparatus has obtained sufficient learned data to behave autonomically and then, for example, the manipulator unit is replaced with another manipulator unit having a different function, it is impossible that the storage means of the body unit already stores such learned data as to allow the new replaced manipulator unit to sufficiently exhibit its function. In this case, the robot apparatus must newly obtain learned data for the new replaced manipulator unit from the beginning, thereby requiring a large amount of labor and time to obtain learned data.

OBJECTS OF THE INVENTION

In view of the foregoing, It is thus an object of the present invention to provide a robot apparatus that can substantially improve usability as compared with the prior art.

SUMMARY OF THE INVENTION

In order to attain the above objects, according to a first aspect of the present invention, there is provided a robot apparatus having a plurality of component units. The robot unit includes a control means for controlling the plurality of component units, a first component unit which is electrically connected to the control means, having a first unique information associated therewith concerning the first component unit, a second component unit having a second unique information associated therewith concerning the first component unit which replaces the first component, a storage means provided for storing the first unique information and the second unique information, means for generating new unique information based upon both the first unique information and the second unique information and means for writing the new unique information into the storage means. The robot apparatus further includes a plurality of component storage means, with a first component storage means provided with the first component and a second component storage means provided with the second component and wherein the first unique information is stored in the first component storage means and the second unique information is stored in the second component storage means and the new unique information is stored in the second component storage means.

The robot apparatus further includes a plurality of control means, with a first component control means provided with the first component and a second component control means provided with the second component wherein the first component control means controls the first component means and the second component control means controls the second component. The plurality of storage means are built into the respective ones of the component units and contain at least a sensor for measuring a predetermined physical amount and outputting the results of that measurement. The plurality of storage means also store the of the output information of the sensor as input information and a movement history of each the component. The plurality of storage means stores the movement history and input information as learned data with which the coupling units make unique movements in response to the input information.

The nature, principle and utility of the invention will become more apparent from the following detailed description when read in conjunction with the accompanying drawings in which like parts are designated by like reference numerals or characters.

BRIEF DESCRIPTION OF THE DRAWINGS

For a more complete understanding of the invention, reference is made to the following description and accompanying drawings, in which.

DESCRIPTION OF THE PREFERRED EMBODIMENTS

Figure 1:
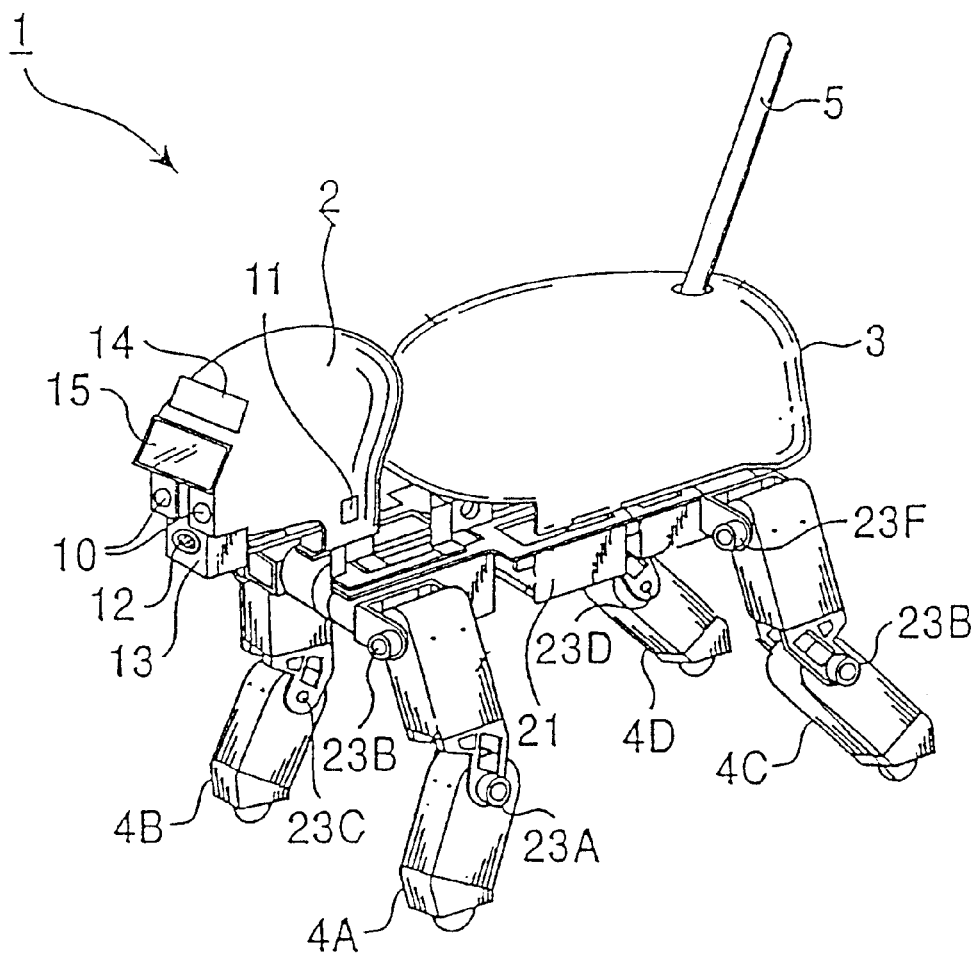
FIG. 1 is a schematic view showing one embodiment of a robot apparatus constructed in according with the present invention.

The following is a detailed description of embodiments of the present invention with reference to the drawings. FIG. 1 is a schematic view showing a typical configuration of a robot apparatus. The pet robot 1 comprises a head portion 2, a body portion 3, leg portions 4A–4D, and a tail portion 5. These components are appropriately coupled into the form of a pet as desired. Head portion 2, leg portions 4A–4D and tail portion 5 are moved relative to body portion 3 so that the pet robot behaves like a genuine four-footed animal. The robot apparatus 1 manages learned data required to autonomically determine its movement, by distributing the learned data to the units.

Head portion 2 includes an image detecting unit 10, corresponding to eyes of a live pet, and comprising, e.g., a CCD (Charge Coupled Device) camera for detecting an image. A microphone 11, corresponding to an ear of a live pet, receives and hears various sounds, such as a voice. A speaker 12, corresponding to a mouth of a live pet, generates a voice. Each of these components is attached to head portion 2 at respective predetermined positions. Head portion 2 further includes a remote controller command receiver 13 for receiving commands transmitted from a user via a remote controller (not shown). A touch sensor 14 is also provided for detecting the contact of a user's hand upon head portion 2.

In a preferred embodiment, pet robot 1 is provided with both red and green LEDs, indicative of anger and pleasure, respectively. Body portion 3 includes a battery 21 attached to a position corresponding to the belly of a live pet. An electronic circuit (not shown) is installed within body portion 3 for controlling the operation of pet robot 1.

Actuators 23A–23N (some of which are not shown) are provided respectively at articulation joints of legs 4A–4D, at joints between legs 4A–4D and body portion 3, at a joint between body portion 3 and head portion 2, at a joint between body portion 3 and tail portion 5, etc. Actuators 23A–23N are driven under control of electronic circuit installed within body portion 3. Pet robot 1 is able to move as a genuine four-footed animal by driving the actuators 23A–23N in such a manner that head portion 2 swings vertically or horizontally, tail portion 5 wags, and legs 4A–4D moves to make the pet robot walk or run, as desired.

Figure 2:
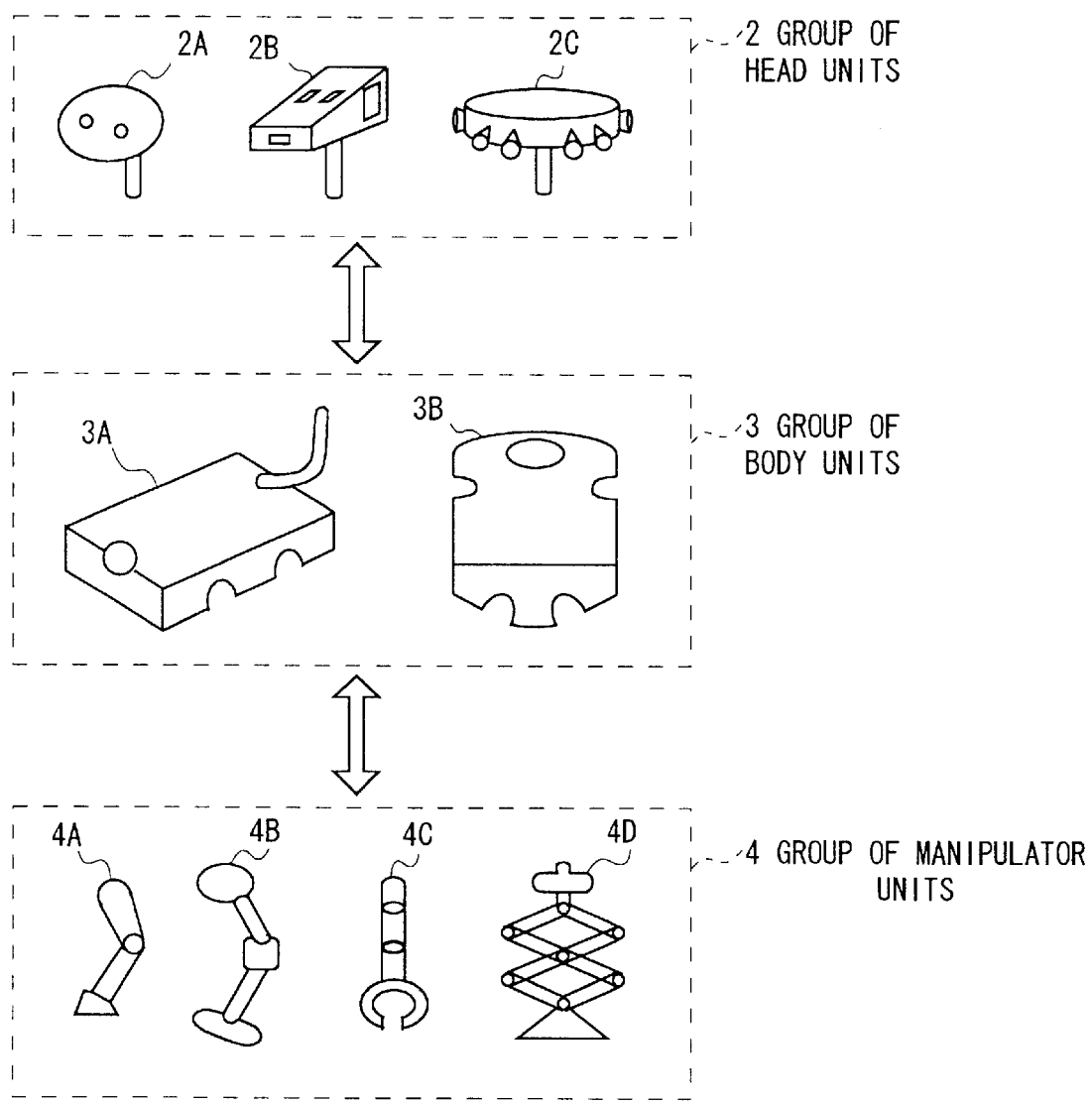
FIG. 2 is a schematic diagram showing a group of units for constructing the robot apparatus.

The robot apparatus 1 is constituted by combining, for example, as shown in FIG. 2, the head unit 2A selected from a group 2 of head units including head units 2A, 2B and 2C as a coupling unit, the body unit 3A selected from a group 3 of body units including body units 3A and 3B as a body unit, the manipulator unit 4A selected from a group 4 of manipulator units including manipulator units 4A, 4B, 4C and 4D as a coupling unit.

In the robot apparatus 1 which is composed of the above selected units, if the manipulator unit 4A must be replaced with a new one, the combination of units can be changed by selecting, for example, the manipulator unit 4C from the manipulator unit group 4 and replacing the currently connected manipulator unit 4A with it.

The manipulator unit 4A has a function for trotting, and the manipulator unit 4C has a function for grasping an object, so learned data obtained by each unit is comprised of such data as to exhibit its function. Thus, after replacing the manipulator unit 4A with the manipulator unit 4C, the robot apparatus 1 cannot allow the manipulator section 4C to exhibit its function even by applying the learned data obtained by the manipulator unit 4A to the manipulator unit 4C. Therefore, the robot apparatus 1 is configured to manage learned data by distributing it to the units so that the new replaced unit can fully show its function after replacement.

Figure 3A:
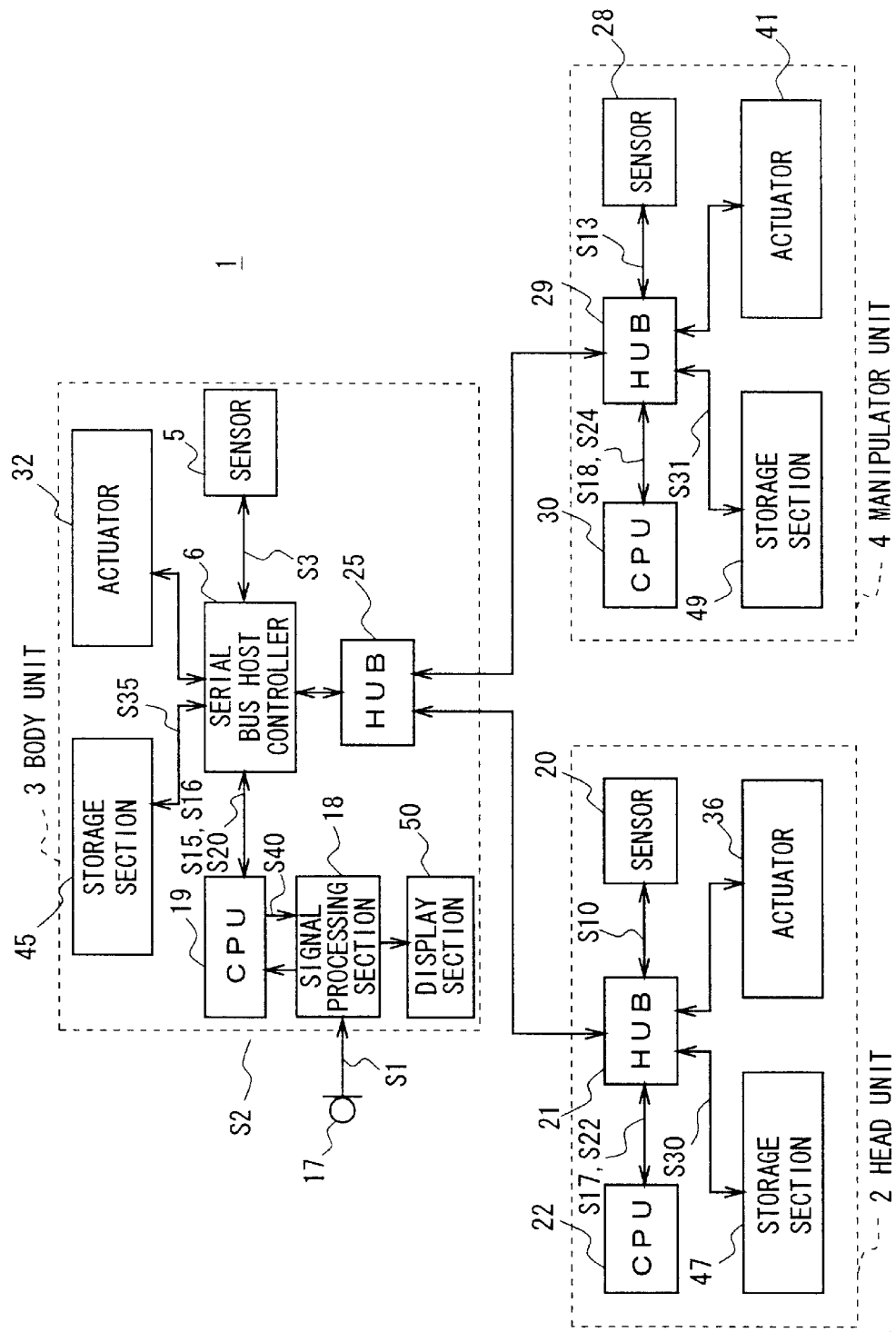
FIG. 3a is a block diagram showing a circuit configuration of a first embodiment of the robot apparatus.

FIG. 3a shows a circuit configuration of the robot apparatus 1. When a user first makes a desired sound for a desired movement, the body unit 3 uses a microphone 17 to catch the sound and inputs a resulting audio signal S1 to a signal processing section 18. The signal processing section 18 applies predetermined data processing to the audio signal S1 and resulting desired movement data S2 to a body central processing unit (CPU) 19 acting as a movement control means.

The body unit 3 uses a sensor 5 comprising the charge coupled device (CCD) camera to convert surrounding conditions into body image data S3, and sends this data out to the body CPU 19 via a serial bus host controller 6 that control a bus. At this point, the head unit 2 sends out head image data S10 obtained by a sensor 20 comprising the CCD camera 10, to the body unit 3 via a hub 21 and to a head CPU 22. The body unit 3 inputs the head image data S10 to the CPU 19 via a hub 25 and a serial bus host controller 6 in this order. Likewise, the manipulator unit 4 sends out sensing data S13 obtained by a st least one of sensors 28 including a CCD camera, a potention meter, and a pressure sensor or the like to the body unit 3 and to a manipulator CPU 30 via a hub 29, and this data is sent to the body CPU 19 via the hub 25 and serial bus host controller 6 of the body unit 3 in this order.

In addition, the body CPU 19, when receiving the desired movement data S2, first generates a drive signal S15 for driving the entire robot apparatus 1, and generates a body drive signal S16 for driving the body unit 3, based on the drive signal. The body CPU 19 then sends out the drive signal S16 to an actuator 32 via the serial bus host controller 6 to drive the actuator 32, and allows the body unit 3 to make a movement such as tail wagging. Concurrently, the body CPU 19 sends out the drive signal S15 to the head unit 2 and manipulator unit 4 via the serial bus host controller 6 and the hub 25 in this order.

The head unit 2 inputs the drive signal S15 supplied from the body unit 3, to the head CPU 22 via the hub 21. Based on the drive signal S15, the head CPU 22 generates a head drive signal S17 for driving the head unit 2 and sends out this signal to an actuator 36 via the hub 21 to drive the actuator 36, and allows the head unit 2 to make a movement.

Similarly, the manipulator unit 4 inputs the drive signal S15 supplied from the body unit 3, to the CPU 30 via the hub 29. Based on the drive signal S15, the manipulator CPU 30 generates a manipulator drive signal S18 for driving the manipulator unit 4 and sends out this signal to an actuator 41 via the hub 29 to drive the actuator 41, and allows the manipulator unit 4 to make a movement.

In this case, the body CPU 19 of the body unit 3 stores in a body storage section 45 as learned data S20, the desired movement data S2 input with the microphone 17, the body image data S3 input with the sensor 5, and the body drive signal S16 for driving the body unit 3. Incidentally, the body CPU 19 is adapted to send out the desired movement data S2 to the head unit 2 and manipulator unit 4 via the serial bus host controller 6 and the hub 25 in this order.

Thus, the head CPU 22 of the head unit 2, receiving the desired movement data S2 from the body unit 3, stores in a head storage section 47 as learned data S22, the desired movement data S2, the head image data S10 input with the sensor 20, and the head drive signal S17 for driving the head unit 2. In addition, the manipulator CPU 30 of the manipulator unit 4, receiving the desired movement data S2 from the body unit 3, stores in a manipulator storage section 49 as learned data S24, the desired movement data S2, the manipulator image data S13 input with the sensor 28, and the manipulator drive signal S18 for driving the manipulator unit 4.

The robot apparatus 1 sequentially repeats the above processing to store the learned data in the storage section 45, 47, and 49 of each unit. Subsequently, if a movement is made in response to the desired movement data S2 the same as that stored in the storage section, the past learned data S20 stored in the storage section 45 and the new learned data S20 each is evaluated based on a predetermined criterion.

As a result, if the body unit 3 determines that the present learned data S20 has higher rating than the past learned data S20, it deletes the past learned data S20 from the body storage means 45 and newly stores the present learned data S20. On the other hand, if the body unit 3 determines that the past learned data S20 has higher rating than the present learned data S20, it discards the present learned data S20 and keeps the past learned data S20 in the body storage means 45.

Similarly, the head unit 2 updates the learned data S22 stored in the head storage section 47 to accumulate the learned data S22, while the manipulator unit 4 updates the learned data S24 stored in the manipulator storage section 49 to accumulate the learned data S24. In this manner, the robot apparatus 1 gradually obtains learned data to acquire the capability of determining a movement suitable for an externally provided command, and uses as a method for managing the obtained learned data, object-oriented learning that manages data by distributing it to each unit.

The case will be described in which the manipulator units 4A and 4C (FIG. 2) storing therein learned data obtained by repeating the above processing generate new learned data based on both the learned data stored in the manipulator unit 4A and the learned data stored in the manipulator unit 4C (hereafter, this is referred to as "blending") and then the blended learned data is stored in the manipulator unit 4C.

When a user first connects the manipulator unit 4A to the body unit 2A, the manipulator CPU 30 of the manipulator unit 4A reads out the learned data S24 from the manipulator storage section 49 of the manipulator unit 4A and transfers this data to the body storage section 45 for storage, via the hub 29, the hub 25 and the serial bus host controller 6 of the body unit 3A in this order.

Subsequently, the user removes the manipulator unit 4A from the body unit 2A and connects the manipulator unit 4C to the body unit 2A. In response to this, the manipulator CPU 30 of the manipulator unit 4C reads out the learned data S24 from the manipulator storage section 49 of the manipulator unit 4C and transfers this data to the body storage section 45 for storage, via the hub 29, the hub 25 and the serial bus host controller 6 of the body unit 3A in this order.

The body CPU 19 as a learning data blending means of the body unit 3A has inside a work area such as a memory and reads out the learned data of the manipulator unit 4A and the learned data of the manipulator unit 4C from the body storage section 45 to transfer these data to the work area. The body CPU 19 blends in this work area the learned data of the manipulator unit 4A with the learned data of the manipulator unit 4C to generate new learned data, that is, blended learned data. The generated blended learned data is sent out to the manipulator storage section 49 of the manipulator unit 4C for storage via the serial bus controller 6, the hub 25, and the hub 29 of the manipulator unit 4C in this order.

Thus, the manipulator unit 4C can have not only the capability of behaving based on the learned data obtained by itself but also the capability of behaving based on the learned data obtained by the manipulator unit 4A, thereby improving its own movement capability without the needs for learning processing.

Now, a data format of learned data will be described. For example, the learned data S24 obtained by the manipulator unit 4 is comprised command data T indicating the desired movement data S2 instructed by the user, a vector (g) indicating the condition of the manipulator image data S13 input from the sensor 28, and a vector (a) indicating the manipulator drive signal S18 to be supplied to the actuator 41. The learned data S24 is represented by the vector T, the vector (g) and the vector (a).

Specifically, the command data T indicating the desired movement data S2 indicates, for example, "forward," "kick," and "jump" or the like. The state vector (g) indicating the condition of the manipulator image data S13 input from the sensor 28 is represented by the m-dimensional condition vector $G^m = \{g(1), g(2), g(3), \ldots, g(m)\}$, where (m) indicates the number of conditions of the manipulator image data S13, that is, the types of feature quantities. The movement vector (a) indicating the manipulator drive signal S18 to be supplied to the actuator 41 is represented by the n-dimensional movement vector $A^n = \{a(1), a(2), a(3), \ldots, a(n)\}$, where (n) corresponds to the number of motors in the manipulator unit 4.

Subsequently, the case will be described in which the learned data of the manipulator unit 4A is represented by data $T_1$, vector $g_1$, vector $a_1$, the learned data of the manipulator unit 4B is represented by data $T_2$ vector $g_2$, vector $a_2$, and these data are blended together and stored in the manipulator unit 4B. In this case, if the learned data (data $T_1$, vector $g_1$, vector $a_1$) is identical to the learned data (data $T_2$ vector $g_2$, vector $a_2$), the body CPU 19 need not carry out the blending processing and stores either of them as blended learned data.

If the command data $T_1$ and the command data $T_2$ are identical and the state vector $g_1$ is different from the state vector $g_2$ and/or the movement vector $a_1$ is different from the movement vector $a_2$ the body CPU 19 of the body unit 3 evaluates each learned data based on an evaluation function which uses a time of duration and power consumption required for movement in response to a given command as parameters. Thus, the body CPU 19 selects as blended learned data the learned data that has higher rating, while discarding the learned data having lower rating. In the case where the command data $T_1$ is different from the command data $T_2$, that is, their desired movements are different from each other, the CPU 12 of the body unit 3 stores both the learned data (data $T_1$, vector $g_1$, vector $a_1$ and the learned data (data $T_2$, vector $g_2$, vector $a_2$).

For example, in the case where the learned data "a movement of shoot" of the manipulator unit 4A is blended with the learned data "a movement of pass" of the manipulator unit 4B, the body CPU 19 of the body unit 3 generates the blended learned data "movements of shoot and pass". In addition, in the case where the learned data "capability of navigation from point A to point B" of the head unit 4A is blended with the learned data "capability of navigation from point B to point C" of the head unit 4B, the body CPU 19 of the body unit 3 generates the blended learned data "capability of navigation from point A to point C." In this manner, the body CPU 19 of the body unit 3 blends the learned data together to improve the capability of each unit.

Now, the reinforced learning processing will be described, which determines a combination of units suitable for a given desired movement and generates combination learned data. The user first provides a desired movement to the body unit 3A and then, for example, couples the head unit 2A, the body unit 3A, and the manipulator unit 4A together to construct the robot apparatus 1 (FIG. 1).

The head CPU 22 of the head unit 2A reads out from the head storage section 47 identification information S30 indicating the head unit 2A and sends out this information to the body CPU 19 via the hub 21, the hub 25 and the serial bus host controller 6 of the body unit 3A. In addition, the manipulator CPU 30 of the manipulator unit 4A reads out from the manipulator storage section 49 identification information S31 indicating the manipulator unit 4A and sends out this information to the body CPU 19 via the hub 29, the hub 25 and the serial bus host controller 6 of the body unit 3A. This information may contain any information which is common to all manipulator units or unique information which is specific to the manipulator, including but not limited to history, behavior, serial number, manufacturer, model number, company name, calibration information, capabilities, time information, etc.

The body CPU 19 of the body unit 3A reads out from the body storage section 45 identification information S35 indicating the body unit 3A and stores the identification information S35 for the body unit 3A, the identification information S30 for the head unit 2A, and the identification information S31 for the manipulator unit 4A, in the body storage section 45 as coupling information indicating the current combination of units. Further, the body CPU 19 sets a desired movement based on the desired movement data S2 to make a movement.

In this case, the body CPU 19 of the body unit 3A determines whether the movement has been successfully made, with the set desired movement as a reference. As a result, if the body CPU 19 has made a positive determination, then it determines that the current combination of units is suited for the desired movement, and sends out the externally provided desired movement data S2 to the body storage section 45 to store therein the desired movement data S2 and the above combination information as combination learned data.

On the contrary, if the body CPU 19 determines that the movement has failed, it generates an execution result signal S40 indicating the failure of the movement. Then, the body CPU 12 uses the signal processing section 11 to subject this signal to predetermined data processing and then sends the resultant out to a display section 50 as an output means comprising a liquid crystal display. The display section 50 shows the predetermined message "Task failed. Replace unit." When the user replaces, for example, the manipulator unit 4A in response to this display, the body CPU 12 of the body unit 3A updates and stores the coupling information S37 in the body storage section 45 and then makes the desired movement again. By repeating these processing, the robot apparatus can obtain combination learned data comprising a combination of units suitable for the desired movement provided by the user.

Figure 3B:
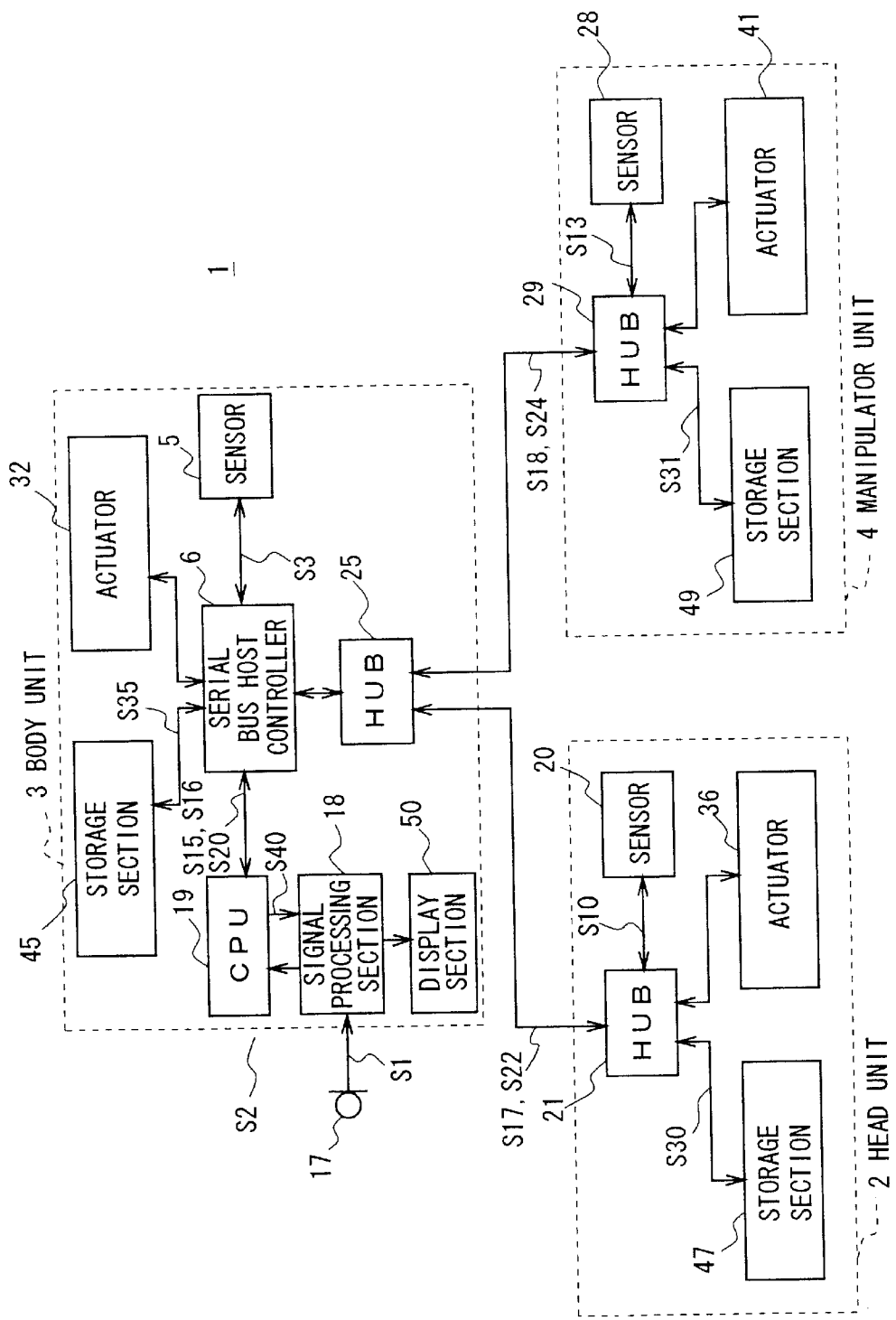
FIG. 3b is a block diagram showing a circuit configuration of a second embodiment of the robot apparatus.

FIG. 3b shows a circuit configuration of a second embodiment of the robot apparatus 1. Items which are numbered the same operate the same as in FIG. 3a and will not be discussed again.

The body unit 3 uses a sensor 5 comprising the charge coupled device (CCD) camera to convert surrounding conditions into body image data S3, and sends this data out to the body CPU 19 via a serial bus host controller 6 that control a bus. At this point, the head unit 2 sends out head image data S10 obtained by a sensor 20 comprising the CCD camera 10, to the body unit 3 via a hub 21. The body unit 3 inputs the head image data S10 to the CPU 19 via a hub 25 and a serial bus host controller 6 in this order. Likewise, the manipulator unit 4 sends out sensing data S13 obtained by at least on of sensors 28 comprising a CCD camera, to the body unit 3 via a hub 29, and this data is sent to the body CPU 19 via the hub 25 and serial bus host controller 6 of the body unit 3 in this order.

In addition, the body CPU 19, when receiving the desired movement data S2, first generates a drive signal S15 for driving the entire robot apparatus 1, and generates a body drive signal S16 for driving the body unit 3, based on the drive signal. The body CPU 19 then sends out the drive signal S16 to an actuator 32 via the serial bus host controller 6 to drive the actuator 32, and allows the body unit 3 to make a movement such as tail wagging. Concurrently, the body CPU 19 sends out the drive signal S15 to the head unit 2 and manipulator unit 4 via the serial bus host controller 6 and the hub 25 in this order.

The head unit 2 inputs the drive signal S15 supplied from the body unit 3, to the body CPU 19 via the hub 21. Based on the drive signal S15, the body CPU 19 generates a head drive signal S17 for driving the head unit 2 and sends out this signal to an actuator 36 via the hub 21 to drive the actuator 36, and allows the head unit 2 to make a movement.

Similarly, the manipulator unit 4 inputs the drive signal S15 supplied from the body unit 3, to the body CPU 19 via the hub 29. Based on the drive signal S15, the body CPU 19 generates a manipulator drive signal S18 for driving the manipulator unit 4 and sends out this signal to an actuator 41 via the hub 29 to drive the actuator 41, and allows the manipulator unit 4 to make a movement.

In this case, the body CPU 19 of the body unit 3 stores in a body storage section 45 as learned data S20, the desired movement data S2 input with the microphone 17, the body image data S3 input with the sensor 5, and the body drive signal S16 for driving the body unit 3. Incidentally, the body CPU 19 is adapted to send out the desired movement data S2 to the head unit 2 and manipulator unit 4 via the serial bus host controller 6 and the hub 25 in this order.

Thus, the body CPU 19, receiving the desired movement data S2 from the body unit 3, stores in a head storage section 47 as learned data S22, the desired movement data S2, the head image data S10 input with the sensor 20, and the head drive signal S17 for driving the head unit 2. In addition, the body CPU 19, receiving the desired movement data S2 from the body unit 3, stores in a manipulator storage section 47 as learned data S24, the desired movement data S2, the manipulator image data S13 input with the sensor 28, and the manipulator drive signal S18 for driving the manipulator unit 4.

The robot apparatus 1 sequentially repeats the above processing to store the learned data in the storage sections 45, 47 and 49. Subsequently, if a movement is made in response to the desired movement data S2 the same as that stored in the storage section, the past learned data S20 stored in the storage section 45 and the new learned data S20 each is evaluated based on a predetermined criterion.

As a result, if the body unit 3 determines that the present learned data S20 has higher rating than the past learned data S20, it deletes the past learned data S20 from the body storage means 45 and newly stores the present learned data S20. On the other hand, if the body unit 3 determines that the past learned data S20 has higher rating than the present learned data S20, it discards the present learned data S20 and keeps the past learned data S20 in the body storage means 45.

Similarly, the head unit 2 updates the learned data S22 stored in the head storage section 47 to accumulate the learned data S22, while the manipulator unit 4 updates the learned data S24 stored in the manipulator storage section 49 to accumulate the learned data S24. In this manner, the robot apparatus 1 gradually obtains learned data to acquire the capability of determining a movement suitable for an externally provided command, and uses as a method for managing the obtained learned data, object-oriented learning that manages data by distributing it to each unit.

The case will be described in which the manipulator units 4A and 4C (FIG. 2) storing therein learned data obtained by repeating the above processing generate new learned data based on both the learned data stored in the manipulator unit 4A and the learned data stored in the manipulator unit 4C (hereafter, this is referred to as "blending") and then the blended learned data is stored in the manipulator unit 4C.

When a user first connects the manipulator unit 4A to the body unit 2A, the body CPU 19 of the manipulator unit 4A reads out the learned data S24 from the manipulator storage section 49 of the manipulator unit 4A and transfers this data to the body storage section 45 for storage, via the hub 29, the hub 25 and the serial bus host controller 6 of the body unit 3A in this order.

Subsequently, the user removes the manipulator unit 4A from the body unit 2A and connects the manipulator unit 4C to the body unit 2A. In response to this, the body CPU 19 reads out the learned data S24 from the manipulator storage section 49 and transfers this data to the body storage section 45 for storage, via the hub 29, the hub 25 and the serial bus host controller 6 of the body unit 3A in this order.

The body CPU 19 as a learning data blending means of the body unit 3A has inside a work area such as a memory and reads out the learned data of the manipulator unit 4A and the learned data of the manipulator unit 4C from the body storage section 45 to transfer these data to the work area. The body CPU 19 blends in this work area the learned data of the manipulator unit 4A with the learned data of the manipulator unit 4C to generate new learned data, that is, blended learned data. The generated blended learned data is sent out to the manipulator storage section 49 for storage via the serial bus controller 6, the hub 25, and the hub 29 in that order.

Thus, the manipulator unit 4C can have not only the capability of behaving based on the learned data obtained by itself but also the capability of behaving based on the learned data obtained by the manipulator unit 4A, thereby improving its own movement capability without the needs for learning processing.

Next, a learning-data blending processing procedure, for example, a procedure for blending the learned data S24 of the manipulator unit 4A (FIG. 2) with the learned data S24 of the manipulator unit 4B (FIG. 2) will be described using the flowchart shown in FIG. 4. Incidentally, the following description is applicable to procedures for blending together the learned data of other units together, so the description of these procedures is omitted.

First, in step SP2 following SP1, when the manipulator unit 4A is coupled to the body unit 3A, the body CPU 19 of the body unit 3A reads out the learned data S24 from the manipulator storage section 49 of the manipulator unit 4A via the hub 2S and transfers this data to the body storage section 45.

In step SP3, upon recognizing that the user has removed the manipulator section 4A from the body unit 3A and the manipulator unit 4B is newly attached on the body unit 3A for replacement, the body CPU 19 proceeds to the next step SP4. In step SP4, the body CPU 19 of the body unit 3A reads out the learned data S24 from the manipulator storage section 49 of the newly attached manipulator unit 4B, transfers this data to the body storage section 45, and then blends the learned data of the manipulator unit 4A and the learned data of the manipulator unit 4B to generate blended learned data, which is then stored in the body storage section 45.

In the subsequent step SP5, the CPU 12 of the body unit 3A sends out the generated blended learned data to the manipulator storage section 49 of the manipulator unit 4B, which is then overwritten with this data for storage. In step SP6, the body CPU 19 of the body unit 3A deletes the blended learned data stored in the body storage section 45 and then returns to step SP1 to repeat the processing.

Figure 5:
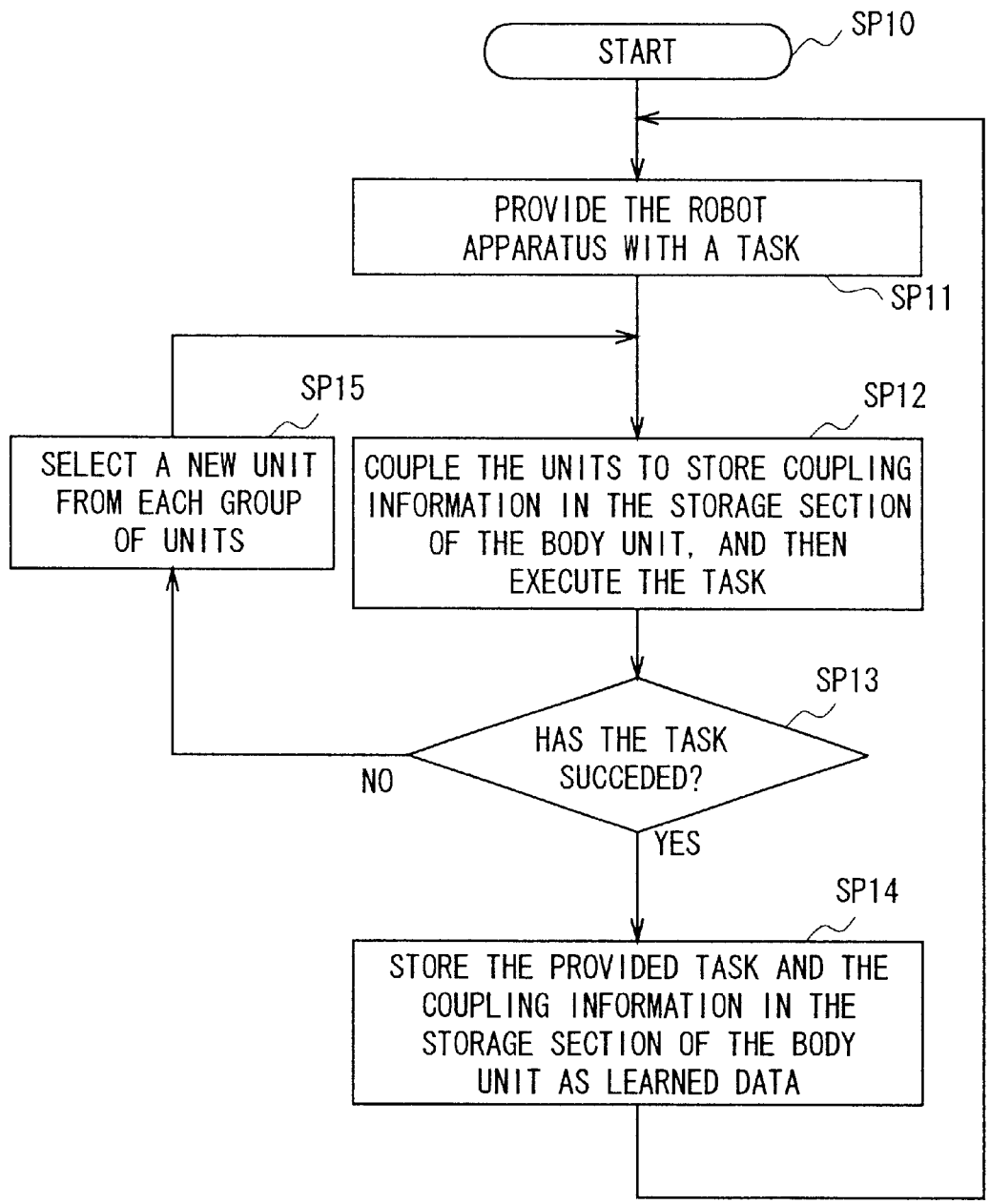
FIG. 5 is a flowchart showing a procedure for generating combination learned data.

Next, a procedure for generating combination learned data will be explained with reference to the flowchart shown in FIG. 5. In step SP11 following step SP10, the desired movement data S2 is provided from the external to the main CPU 19 of the body unit 3A. In step SP12, desired units, for example, the head unit 2A and the manipulator unit 4A are coupled together. Then, the body CPU 19 stores in the body storage section 45 coupling information indicating the current combination of units and then sets a desired movement based on the desired movement data S2 to execute a task corresponding to the desired movement.

In step SP13, the body CPU 19 of the body unit 3A determines whether the task has been successfully executed, with the set desired movement as a reference. As a result, when the body CPU 19 of the body unit 3A has made a positive determination, the processing proceeds to step SP14, whereas when it has determined that the task has failed, the processing proceeds to step SP15.

In step SP14, the body CPU 19 of the body unit 3A determines that the current combination of units is suited for the provided desired movement, and stores in the body storage section 45 the desired movement and the above combination information as combination learned data. On the contrary, in step SP15 the body CPU 19 of the body unit 3A displays a predetermined message on the display section 50 to prompt the user to replace the unit with a new one. When the user replaces the unit in response to the message on the display section 50, the body CPU 19 returns to step SP12 to repeat the above processing.

With the above configuration, the robot apparatus 1 previously obtains learned data required to autonomically determine a movement corresponding to a command from a user or surrounding conditions, and manages the obtained learned data by distributing it to the storage sections of the units. Thus, when a unit is replaced with a new one, the learned data obtained by the unit to be replaced can be blended with the learned data obtained by the new unit to obviate the need to obtain learned data corresponding to the learned data obtained by the former unit from the beginning, thereby reducing the labor and time required to obtain learned data.

In addition, the robot apparatus 1 previously obtains combination learned data indicating a combination of units suitable for performing a desired movement provided by the user, and when the user specifies a movement, it notifies the user of a combination suitable for the movement, thereby enabling the user to easily determine a combination of units suited to make the desired movement.

With the above configuration, by previously obtaining learned data required to autonomically determine a movement in accordance with to externally provided information, and managing the obtained learned data by distributing it to each unit, the learned data obtained by a unit to be replaced can be blended with the learned data obtained by the new unit to reduce the labor and time required to obtain learned data, thereby realizing the robot apparatus 1 with improved usability.

In addition, by previously obtaining learned data required to autonomically determine a movement in accordance with an instruction provided by a user, and when the user provides an instruction, the user is informed of a combination corresponding to it. Therefore, the user can easily determine a combination of units suited to make the desired movement, thereby realizing the robot apparatus 1 with improved usability.

Figure 4:
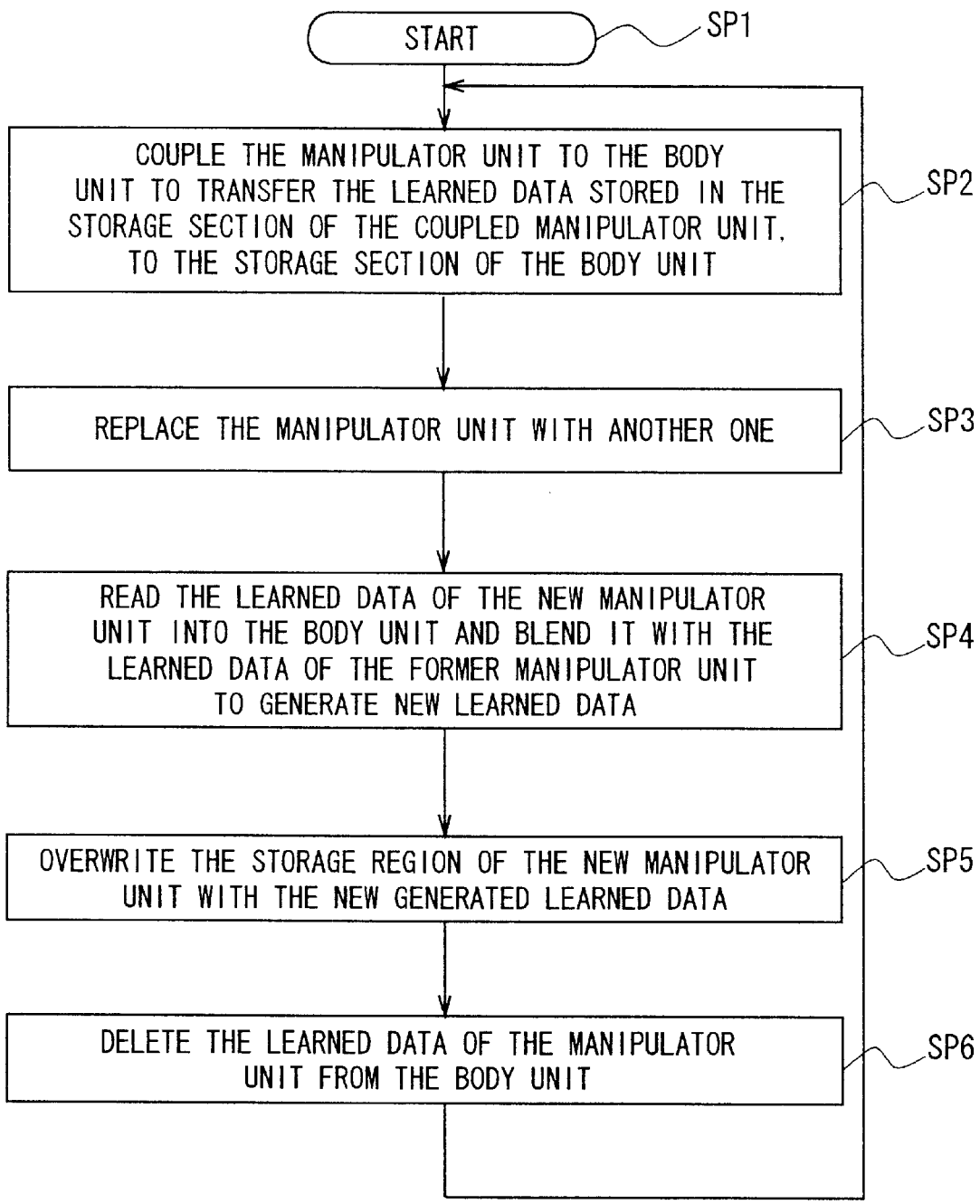
FIG. 4 is a flowchart showing a procedure for blending learned data.

Note that, in the aforementioned embodiment, the blended learned data stored in body storage section 45 is deleted in step SP6 of the learned data blending processing procedure shown in FIG. 4. However, the present invention is not limited thereto and the blended learned data can be stored and held rather than being deleted.

In addition, in the aforementioned embodiment, the combination learned data is stored in the body storage section 45 of the body unit 3. However, the present invention is not limited thereto and the combination learned data can be managed by distributing and storing it in the body storage section 45 of the body unit 3, the head storage section 47 of the head unit 2, and the manipulator storage section 49 of the manipulator unit 4.

In addition, in the aforementioned embodiment, the desired movement is set based on the externally supplied desired movement data S2. However, the present invention is not limited thereto and the robot apparatus can set a desired movement by itself based on the body image data S3 supplied from the sensor 15 or various other data.

In addition, in the aforementioned embodiment, the desired movement provided by the user and the combination of units suitable for the desired movement are stored in the body storage section 45 as combination learned data. However, the present invention is not limited thereto and the body storage section 45 can store data of combinations unsuitable for the desired movement as well as the desired movement and the combination of units suitable for the desired movement.

In addition, in the aforementioned embodiment, the learned data includes the externally provided desired movement data S2, the image data input with the sensor, and the drive signal for driving the unit. The present invention, however, is not limited thereto and, in short, the learned data can include externally input information and the movement history of the coupling units in response to the input information.

Furthermore, in the aforementioned embodiment, the present invention is applied to the robot apparatus 1 constituted by coupling together the head unit 2, the body unit 3, and the manipulator unit 4. The present invention, however, is not limited thereto and is applicable to a robot apparatus constituted by coupling a body unit and a manipulator unit together or combining various other coupling units together.

As described above, in the present invention, input information and the movement history of coupling units in response to the input information are stored in a storage means as learned data instead of the input information and the movement history of the entire robot apparatus in response to the input information. Thus, even if a coupling unit is replaced with a new one, the learned data of the new coupling unit can be used as it is to determine a movement of the coupling unit, thereby providing a robot apparatus that can substantially improve usability as compared with the prior art.

Further, in the present invention, the combination of coupling units and the movement history of a movement control means based on the input information are stored in a storage means as combination learned data, and the combination learned data is read out from the storage means as required and outputs it to the external via an output means. Consequently, the user can easily determine a combination suitable for making a desired movement, so the present invention can provide a robot apparatus that can substantially improve usability compared to the prior art.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

Having now fully described the invention, it will be apparent to one of ordinary skill in the art that many changes and modifications can be made thereto without departing from the spirit and scope of the invention as set forth herein.

What is claimed is:

1. A robot apparatus having a plurality of component units, comprising:

a controller for controlling said plurality of component units;

a first component unit which is electrically connected to said controller, having a first unique information associated therewith concerning said first component unit;

a second component unit having a second unique information associated therewith concerning said first component unit which replaces said first component unit;

a storage device provided for storing said first unique information and said second unique information;

a generator for generating new unique information based upon both said first unique information and said second unique information; and a write unit for writing said new unique information into said storage device.

2. The robot apparatus of claim 1 and further comprising:

a plurality of component storage units, with a first component storage unit provided with said first component unit and a second component storage unit provided with said second component unit;

wherein said first unique information is stored in said first component storage unit and said second unique information is stored in said second component storage unit; and said new unique information is stored in said second component storage unit.

3. The robot apparatus of claim 2 and further comprising:

a plurality of control units, with a first component control unit provided with said first component unit and a second component control unit provided with said second component unit; and wherein said first component control unit controls said first component unit and said second component control unit controls said second component unit.

4. The robot apparatus of claim 2 wherein said plurality of component storage units are built into respective ones of said component units.

5. The robot apparatus of claim 2, wherein said plurality of component units contain at least a sensor for measuring a predetermined physical amount and for outputing the results of that measurement.

6. The robot apparatus of claim 5, wherein said plurality of component storage units also store the output of said sensor as input information.

7. The robot apparatus of claim 6, wherein said plurality of component storage units also store a movement history of each said component unit.

8. The robot apparatus according to claim 7, wherein said plurality of component storage units store said movement history and input information as learned data with which said component units make unique movements in response to said input information.

9. The robot apparatus according to claim 8, and further comprising a learned data blending unit for reading learned data out from said plurality of component storage units, blending the learned data with the learned data of previously coupled component units to generate new learned data, and storing the generated learned data in said plurality of component storage units of a current component units.

10. The robot apparatus according to claim 2 wherein said unique information is history information of the behavior of said component unit.

11. The robot apparatus according to claim 2 wherein said unique information is a serial number of said component unit.

12. The robot apparatus according to claim 2 wherein said unique information is a manufacturing number of said component unit.

13. The robot apparatus according to claim 2 wherein said unique information is a model number of said component unit.

14. The robot apparatus according to claim 2 wherein said unique information is a company name for said component unit.

15. The robot apparatus according to claim 2 wherein said unique information is parameter information for said component unit.

16. The robot apparatus according to claim 2 wherein said unique information is calibration information for said component unit.

17. The robot apparatus according to claim 2 wherein said unique information is the total time said component unit was used.

18. The robot apparatus according to claim 2 wherein said unique information is the total operating system operating time for said component unit.

* * * * *